United States Patent [19]

Wolf

[11] 4,437,560
[45] Mar. 20, 1984

[54] APPARATUS FOR CHANGING THE DIRECTION OF TRANSPORT OF PAPER STACKS OR THE LIKE

[75] Inventor: Wolfram Wolf, Bilsen, Fed. Rep. of Germany

[73] Assignee: E.C.H. Will (GmbH & Co.), Hamburg, Fed. Rep. of Germany

[21] Appl. No.: 357,282

[22] Filed: Mar. 11, 1982

[30] Foreign Application Priority Data

Mar. 24, 1981 [DE] Fed. Rep. of Germany ....... 3111445

[51] Int. Cl.³ .................................................. B65G 47/26
[52] U.S. Cl. ...................................... 198/457; 198/372
[58] Field of Search .............. 198/367, 370, 372, 412, 198/379, 457, 480, 469, 470, 479; 221/225, 184, 185

[56] References Cited

U.S. PATENT DOCUMENTS

| | | | |
|---|---|---|---|
| 3,175,702 | 3/1965 | Banyas | 198/479 X |
| 3,421,758 | 1/1969 | Cole | 271/82 |
| 3,441,120 | 4/1969 | McGill | 198/479 X |
| 3,502,123 | 3/1970 | Golick et al. | 198/367 X |
| 4,372,435 | 2/1983 | Achelpohl et al. | 271/225 X |

FOREIGN PATENT DOCUMENTS

| | | | |
|---|---|---|---|
| 1958738 | 6/1971 | Fed. Rep. of Germany | 198/480 |
| 55-156123 | 12/1980 | Japan | 198/480 |

*Primary Examiner*—John J. Love
*Attorney, Agent, or Firm*—Peter K. Kontler

[57] ABSTRACT

Apparatus for transferring paper stacks from a first horizontal path into a second horizontal path which is coplanar with the first path has tongs installed at the junction of the two paths and driven to rotate about a vertical axis. The tongs has a lower jaw in the common plane of the two paths and an axially movable upper jaw which is held away from the first jaw when a stack to be transferred approaches the tongs and which is then moved toward the lower jaw to clamp the oncoming stack so that the latter rotates with the jaws and is transferred into the second path. The tongs then opens and is ready to engage the next stack. Signals for closing and opening of the tongs are generated by first and second detectors which are respectively adjacent to the first and second paths and respectively serve to detect certain surfaces of oncoming stacks and certain surfaces of transferred stacks. The starting or upper end position of the axially movable jaw can be adjusted by a feed screw by raising or lowering a pneumatic motor which serves to close and open the tongs.

25 Claims, 3 Drawing Figures

APPARATUS FOR CHANGING THE DIRECTION OF TRANSPORT OF PAPER STACKS OR THE LIKE

BACKGROUND OF THE INVENTION

The present invention relates to apparatus for manipulating commodities during their transport along predetermined paths, especially for manipulating commodities having a predetermined size and shape. Typical examples of such commodities are stacks consisting of paper sheets or the like which are transported in a machine for the making of exercise books, steno pads and/or analogous stationery products. More particularly, the invention relates to improvements in apparatus which can be used to change the orientation of selected or successive commodities as well as the direction of travel of reoriented commodities, for example, in order to segregate defective commodities from a series of randomly distributed satisfactory and defective commodities. Still more particularly, the invention relates to improvements in apparatus which can transfer successive or selected commodities of a short or long series of such commodities from a first path which is defined by one or more first conveyors into a second path which is defined by one or more second conveyors and makes a predetermined angle (e.g., a right angle or an ablique angle) with the first path.

Apparatus of the above outlined character are utilized in various branches of numerous industries, such as in bottling, bottle capping, cigarette packing and paper sheet processing plants. For example, it is customary to change the direction of travel of articles which are produced or treated in a first machine during transport of such articles into a second machine wherein the articles are subjected to further treatment. It is also known to utilize suitable apparatus to divert defective commodities from a file or row of randomly distributed satisfactory and defective commodities, e.g., to remove defective paper stacks from a series of satisfactory and unacceptable stacks. This is highly desirable in order to ensure that the defective stacks are not subjected to unnecessary further treatment and/or that they cannot reach the ultimate user.

Certain heretofore known apparatus of the above outlined character employ a platform which is movable up and down and is designed to lift an oncoming defective commodity (such as a paper stack) above the level of the path of acceptable commodities and into the range of a removing conveyor which transports the lifted commodities at a certain angle to the direction of transport of oncoming acceptable and unsatisfactory commodities. A drawback of such apparatus is that they are incapable of removing selected commodities from the path of oncoming commodities at the rate required in modern high-speed machines which can make and/or process hundreds of commodities per minute, e.g., in a modern production line wherein large sheets of paper are converted into stacks of overlapping smaller sheets and such stacks are converted into exercise books or steno pads with spiral or otherwise configurated binders. The utilization of liftable and lowerable platforms is especially unsatisfactory when the commodities form a row of closely adjacent and rapidly advancing components so that the lifting of a selected commodity interferes with forward progress of the next-following commodity or commodities.

OBJECTS AND SUMMARY OF THE INVENTION

An object of the invention is to provide a novel and improved apparatus which can change the direction of travel of selected or successive commodities with little loss in time and in a small area so that the commodities whose direction of travel is altered do not interfere with the progress of the preceding and/or next-following commodities.

Another object of the invention is to provide an apparatus wherein the commodities can be reoriented to a desired extent, which can manipulate relatively bulky or more compact commodities with equal ease and efficiency, which can be installed in existing machines or production lines as a superior substitute for existing apparatus, and whose operation can be automated to such an extent that it requires a minimum of attention or no attention at all.

A further object of the invention is to provide the apparatus with novel and improved means for changing the orientation of selected or consecutive commodities to a desired extent and for properly engaging and manipulating relatively tall, relatively low or medium-sized commodities, such as stacks of paper sheets or the like.

An additional object of the invention is to provide novel and improved means for imparting movements to one or more components of the orientation changing means.

A further object of the invention is to provide a machine or a production line which embodies the above outlined apparatus.

Another object of the invention is to provide an apparatus which treats the commodities gently, which can manipulate successive or selected commodities with an unprecedented degree of reproducibility, and which is less prone to malfunction than heretofore known apparatus serving similar or analogous purposes.

Still another object of the invention is to provide a simple and compact orientation and direction changing apparatus which consists of a small number of components and which can be readily installed in existing machines or production lines to operate in synchronism with other components or constituents of such machines or production lines.

The invention is embodied in an apparatus for changing the direction of transport of at least some of a series of successive commodities, such as stacks of paper sheets. The apparatus comprises a first conveyor (e.g., a belt conveyor) which serves to transport the commodities of the series along a first path, a second conveyor (e.g., a second belt conveyor) serving to advance commodities along a second path which is inclined with reference to the first path, and means for transferring commodities from the first into the second path (when the need arises or whenever a commodity reaches the transferring means). The transferring means comprises openable and closable tongs extending into portions of the first and second paths and rotating about an axis which is adjacent and inclined relative to the first and second paths, means for rotating the tongs about such axis, and operating means for opening and closing the tongs so that a commodity which advances along the first path can enter the tongs before the tongs closes to transfer the thus engaged commodity into the second path as a result of rotation of the tongs about the aforementioned axis.

The first and second paths can be and preferably are at least substantially coplanar, and the aforementioned axis is preferably normal to the common plane of such paths. The first conveyor can include a first portion which delivers commodities into the range of the tongs and a second portion which receives non-transferred commodities from the first portion. Such apparatus can be used to remove defective commodities from the first path by transferring them into the second path while the satisfactory commodities simply move past the transferring means and advance with the second portion of the first conveyor. In the just outlined apparatus, the second conveyor can branch off the first conveyor in the region between the first and second portions of the first conveyor. In many instances, the two paths are at least substantially horizontal, i.e., the aforementioned axis about which the tongs rotates is then vertical and is located in the region where the second conveyor branches off the first conveyor.

In accordance with a presently preferred embodiment of the transferring means, the tongs comprises a first preferably disc-shaped jaw and a second preferably disc-shaped jaw disposed at a level above the first jaw. The operating means then comprises means for moving at least one of the jaws relative to the other jaw. If the two paths are at least substantially coplanar, the first jaw can be provided with a surface which serves to engage a commodity to be transferred and is coplanar with the two paths. The second jaw then constitutes the one (axially movable) jaw.

The rotating means can comprise a rotary shaft (preferably a shaft having multiple external splines) whose axis coincides with the axis of rotation of the tongs and which is connected with the axially movable second jaw. The first jaw can be formed with an axial passage which axially movably receives the shaft and whose outline is complementary to the cross-section of the shaft so that the latter is rotated and rotates the second jaw in response to rotation of the first jaw or vice versa. The aforementioned operating means then comprises means for raising and lowering the shaft; such raising and lowering means can comprise a fluid-operated motor, e.g., a pneumatic cylinder and piston unit having a reciprocable piston rod which is connected to the shaft by a coupling designed to compel the shaft to share the axial movements of, but permitting the shaft to rotate relative to, the piston rod. Such coupling can constitute a bearing or it may include one or more bearings for the shaft.

In accordance with a presently preferred embodiment of the invention, the first and second paths make an angle which equals or at least closely approximates 90 degrees The apparatus preferably further comprises means for automatically actuating the operating means, i.e., for effecting automatic closing and opening of the tongs. For example, the actuating means may include first detector means which is adjacent to the first path and is arranged to generate signals (such signals effect closing of the tongs) in response to detection of an oncoming commodity at a preselected distance from the tongs, e.g., in response to detection of a trailing surface of the commodity which is to be transferred from the first path into the second path. The actuating means can further comprise second detector means which is adjacent to the second path and serves to generate signals (such signals are used to effect opening of the tongs) in response to detection of a transferred commodity, e.g., in response to detection of the front surface of a paper stack or an analogous commodity which is being transferred from the first into the second path.

The rotating means is preferably designed to drive the jaws of the tongs at a peripheral speed which is less than the speed of the first conveyor.

Still further, the apparatus preferably comprises control means for changing the starting position of the axially movable jaw in order to conform the maximum distance between the jaws to the corresponding dimensions of the commodities (e.g., to the height of stacks which are to be transferred into the second path). Such control means can comprise means for moving the aforementioned motor for the shaft which carries the axially movable jaw in the direction of the aforementioned axis. The moving means of the control means can comprise a rotary feed screw and means for rotating the feed screw clockwise or counterclockwise to thereby move the motor nearer to or further away from the first jaw of the tongs.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

FIG. 2b is a similar vertical sectional view of that portion of the apparatus which is disposed at a level below the structure shown in FIG. 2a.

DESCRIPTION OF THE PREFERRED EMBODIMENTS

Figure 1:
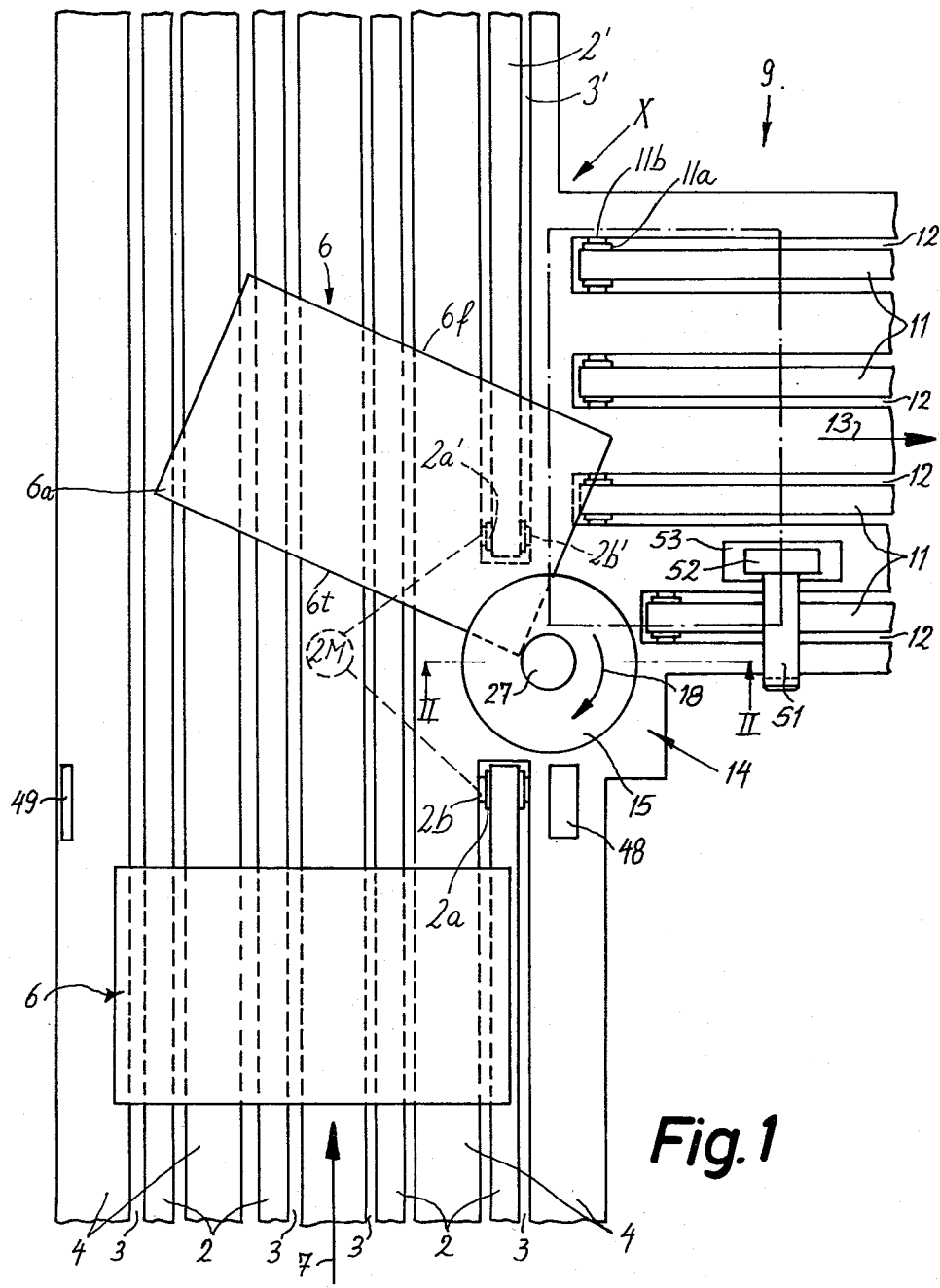
FIG. 1 is a schematic plan view of an apparatus which embodies the invention and is designed to change the direction of transport of paper stacks or like commodities.

FIG. 1 shows an apparatus which comprises a first conveyor 1 constituting a supply conveyor for commodities in the form of paper stacks 6, a second conveyor 9 which constitutes a removing conveyor for each of a series of stacks or for selected (e.g., defective) stacks 6, and a transferring unit which serves to change the orientation and direction of transport of selected stacks 6 at a junction X where the conveyor 9 branches off the conveyor 1. The latter is a carry on conveyor, i.e., those stacks 6 which are not transferred onto the conveyor 9 remain on and are transported by the conveyor 1 in the direction of arrow 7. It can be said that the supply conveyor 1 comprises a first portion upstream and a second portion downstream of the junction X, and that any commodities which are not caused to leave the conveyor 1 at the junction X are transported by the second portion of the conveyor 1 to a further processing station, to storage or elsewhere.

The conveyor 1 comprises several parallel endless belts 2 which are installed in longitudinally extending recesses or cutouts 3 of a stationary horizontal table 4, and similar endless belts 2' in the cutouts 3' of the table 4. The conveyor belts 2 can be said to constitute or form part of the afore-mentioned first portion, and the conveyor belts 2' can be said to constitute or form part of the aforementioned second portion of the supply conveyor 1. The means for driving the belts 2 and 2' comprises pulleys 2a, 2a' and motor means 2M for the shafts 2b, 2b' carrying the respective pulleys 2a, 2a'. The conveyor 9 comprises parallel endless belts 11 in recesses or cutouts 12 of the table 4. The belts 11 are trained over pulleys 11a on shafts 11b and can be driven by the motor means 2M or by a discrete motor, not shown. The direction in which the upper reaches of the belts 11 transport selected stacks 6 is indicated by the arrow 13. In the embodiment of FIG. 1, the coplanar horizontal paths along which the belts 2, 2' on the one hand and the belts 11 on the other hand transport the stacks 6 make an angle of 90 degrees; however, it is equally within the purview of the invention to select an oblique (e.g., an acute or an obtuse) angle, depending on the intended destination of deflected and non-deflected stacks.

The transferring unit includes a tongs 14 having two superimposed coaxial rotary disc-shaped jaws 15 and 16 (see FIG. 2a) which can grip a portion of a selected stack 6 therebetween preparatory to and during transfer from the horizontal path which is defined by the conveyor 1 into the horizontal path which is defined by the conveyor 9. The jaws 15, 16 can move selected stacks 6 along an arcuate path whose vertical axis is shown at 17 and is adjacent and normal to the paths defined by the conveyors 1 and 9. The direction in which the jaws 15 and 16 are driven when the improved apparatus is in use is indicated by the arrow 18. The upper side or surface of the lower jaw 16 is flush with the upper side of the table 4 and with the upper sides of the upper reaches of the belts 2, 2' and 11 (i.e., with the paths defined by the conveyors 1 and 9). This lower jaw has a downwardly extending preferably integral sleeve 21 which is rotatably mounted in a stationary housing 19 by way of several antifriction ball bearings 20. The position of the common vertical axis 17 of the disc-shaped jaws 15, 16 and the diameters of these jaws are selected in such a way that portions of the jaws overlap the two paths, namely, a portion of the path which is defined by the supply conveyor 1 and a portion of the path which is defined by the removing conveyor 9. This ensures that a properly oriented stack 6 on the belts 2 is automatically introduced into the range of the jaws 15, 16 and that such jaws can change the orientation of an engaged stack 6 for the purpose of placing it into the path which is defined by the belts 11, i.e., the belts 11 are then capable of engaging the lowermost sheet of the reoriented stack and of entraining such stack in the direction of arrow 13.

The sleeve 21 has a lower end portion which extends downwardly beyond the housing 19 and is keyed to a driver gear 22 which serves to transmit torque to the jaws 15 and 16. The lower jaw 16 is driven directly by the gear 22 by way of its sleeve 21, and the upper jaw 15 is driven indirectly by way of an externally splined shaft 27 whose multiple splines extend into a complementary axial bore or passage of the sleeve 21 and whose upper end portion is rigidly connected with the disc-shaped jaw 15. Thus, the shaft 27 can move up and down, as indicated by a double-headed arrow 26 shown in FIG. 2a, but is compelled to share all angular movements of the jaw 16.

The gear 22 mates with a second gear 23 which is driven by the main prime mover of the machine embodying the improved apparatus by way of a suitable transmission 24. The gear 23 is keyed to the upwardly extending output shaft of the transmission 24. The parts 22, 23, 24 and 27 can be said to constitute a means for rotating the jaws 15, 16 at the same speed in the direction of arrow 18 while permitting the upper jaw 15 to rise above and away from or to descend toward the jaw 16 therebelow. The angular movements of the jaws 15 and 16 are synchronized with the movements of the belts 2, 2' and 11.

The operating means for moving the splined shaft 27 up and down, i.e., relative to the jaw 16, comprises a fluid-operated motor here shown as a double-acting pneumatic cylinder and piston unit having a normally stationary cylinder 32 (see FIG. 2b) and an upwardly extending reciprocable piston rod 31 which is secured to the lower end portion of the splined shaft 27 by a coupling 29 containing a set of antifriction ball bearings 28 surrounding the trunnion at the lower end of the shaft 27. The races for the balls of the bearings 28 have internal shoulders which prevent axial separation of such races when the shaft 27 is pulled downwardly by the descending piston rod 31.

Figure 2A:
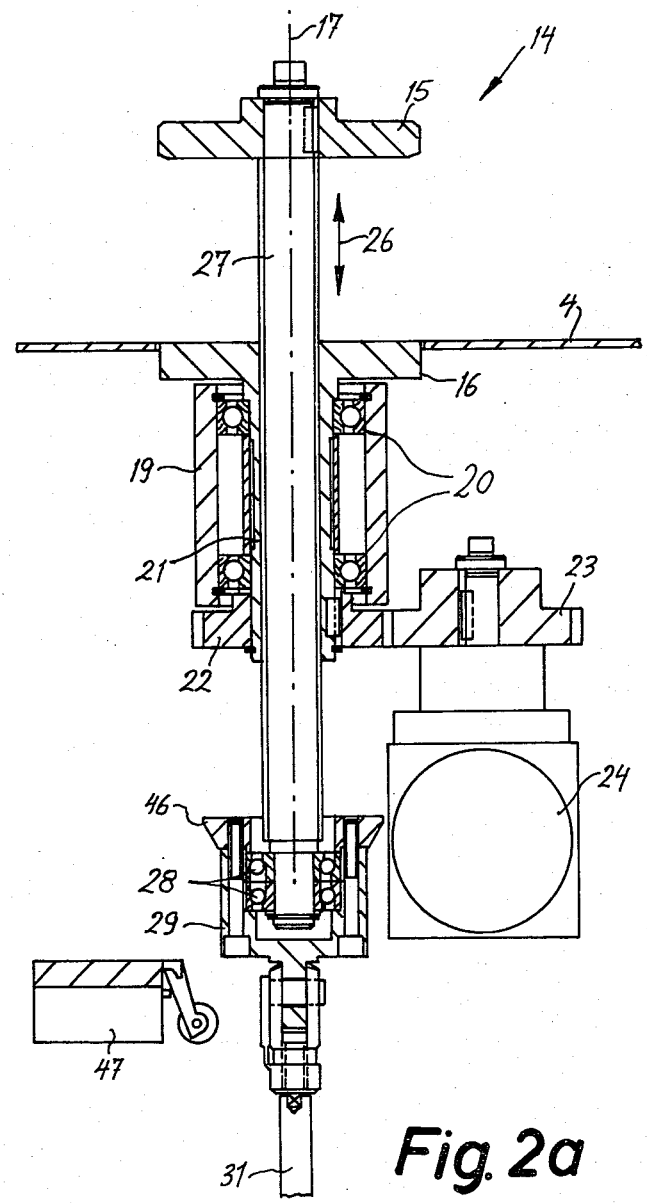
FIG. 2a is an enlarged vertical sectional view substantially as seen in the direction of arrows from the line II—II of FIG. 1.
Figure 2B:
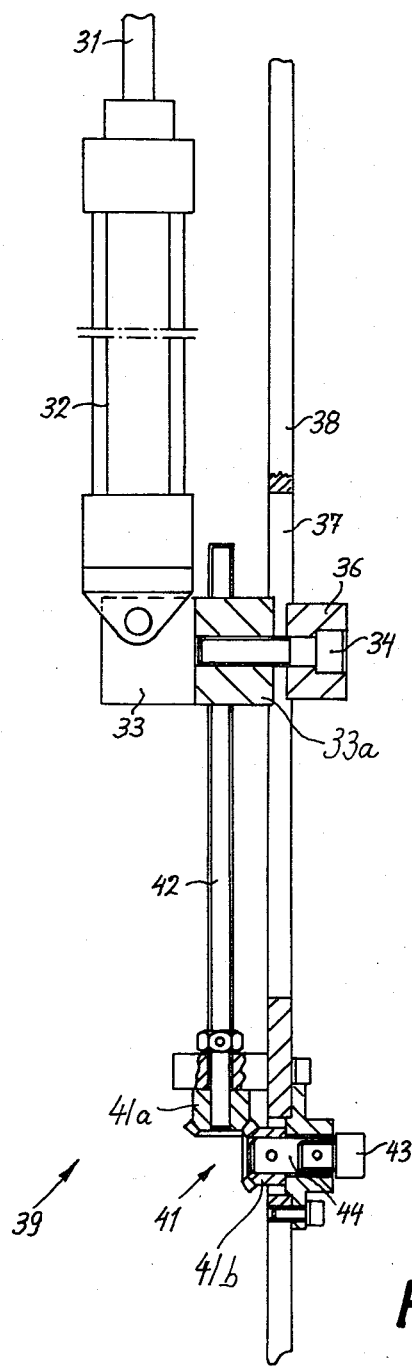

FIG. 2b shows that the lower end portion of the cylinder 32 of the operating means for moving the upper jaw 15 up and down (i.e., of means for opening and closing the tongs 14) is mounted on a holder 33 which is provided with a yoke 33a staddling a portion of an upright guide member in the form of a rail 38 or the like. The guide member 38 has an elongated vertical slot 37 for the shank of a screw 34 which can urge a clamp 36 against the guide member 38 and which meshes with the holder 33. When the screw 34 is tightened, the holder 33 is maintained in the selected position, i.e., at a selected level below the table 4. If the operator wishes to change the upper end position of the upper jaw 15, the screw 34 is loosened and the holder 33 is moved up or down before the screw 34 is tightened again to maintain the holder 33 and the cylinder 32 in the newly selected positions. The control means 39 for adjusting the position of the holder 33 relative to the guide member 38 on loosening of the screw 34 comprises an upright feed screw 42 which extends into a tapped vertical bore of the holder 33 and whose lower end portion is rotated with one bevel gear 41a of a bevel gear transmission 41 whose other bevel gear 41b meshes with the bevel gear 41a and has a horizontal shaft 44 non-rotatably connected with a hexagon socket screw 43. The socket of the screw 43 can receive the head of a hexagonal wrench to rotate the shaft 44 and the bevel gears 41b, 41a whereby the gear 41a rotates the feed screw 42 in a clockwise or counterclockwise direction, depending upon whether the operator wishes to raise or lower the starting (upper end) position of the upper jaw 15 via holder 33 (while the screw 34 is loose), cylinder 32, piston rod 31, coupling 29 and splined shaft 27. The bevel gear transmission 41 and the feed screw 42 are supported by the lower portion of the guide member 38. The parts 41 to 44 and the aforementioned (non-illustrated) wrench together constitute the control means 39 for selecting or adjusting (when necessary) the initial or starting position of the upper jaw 15 relative to the lower jaw 16; the latter is held in the selected axial position so that its upper side or surface is flush with the upper side of the table 4 along which the stacks 6 slide during transport from the belts 2 onto the belts 2' or from the belts 2 onto the belts 11. The starting position of the upper jaw 15 will be changed when the height of the conveyed stacks 6 changes; this ensures that the underside of the upper jaw 15 can engage the topmost sheet of a selected stack 6 in immediate response to downward movement of the piston rod 31 for the purpose of diverting a selected stack 6 from the belts 2 onto the belts 11.

FIG. 2a shows that the coupling 29 comprises an upwardly flaring portion or trip 46 for a limit switch 47 which terminates the downward stroke of the jaw 15 by arresting the piston rod 31. The limit switch 47 forms part of the means for regulating the operation of the pneumatic motor including the cylinder 32, e.g., by starting and interrupting the admission of pressurized fluid to the upper and lower chambers of the cylinder 32 so as to ensure that the piston rod 31 and the shaft 27 will perform downward strokes of desired length.

The actuating means for triggering or initiating the closing of the tongs 14 (downward movement of the axially reciprocable upper jaw 15) comprises a detector 48 which is immediately adjacent to the path defined by the conveyor 1 and is installed close to and upstream of the junction X. The detector 48 is or includes a reflection type photocell which cooperates with a mirror 49. The parts 48 and 49 are disposed at the opposite sides of the path which is defined by the belts 2 of the supply conveyor 1, and the arrangement is such that the photocell 48 transmits a signal when it begins to receive reflected light from the mirror 49, i.e., when the rear or trailing surface 6t of a stack 6 has advanced beyond the monitoring station including the parts 48, 49 so that a light beam which is emitted by the photocell 48 can be reflected back to this photocell by the mirror 49. In other words, the photocell 48 is designed to transmit a signal during transition from dark to bright.

In order to open the tongs 14, the actuating means further comprises a second detector 52 which is a reflection type photocell mounted at a level above the removing conveyor 9 and above the level of the uppermost sheets of deflected (selected) paper stacks 6. The light source of the photocell 52 directs light rays downwardly against a mirror 53 which is installed in the table 4. The photocell 52 is mounted on the table 4 by means of a bracket 51 and is designed to transmit a signal during transition from bright to dark, i.e., when the light which issues from its light source cannot be reflected by the mirror 53 because the photocell has detected the front surface 6f of the freshly transferred stack 6.

The signals which are generated by the photocells 48 and 52 are transmitted to the aforementioned (conventional) regulating means for the fluid-operated motor including the cylinder 32 and the piston rod 31.

The operation is as follows:

As mentioned above, the apparatus can transport successive paper stacks 6 along a straight path which is defined by the belts 2 and 2' of the supply conveyor 1, or along an L-shaped path which is defined by the belts 2 of the supply conveyor 1, by the transferring unit including the tongs 14 and by the belts 11 of the removing conveyor 9. If the apparatus is to transfer all of the stacks 6 from the belts 2 onto the belts 11, the photocell 48 is active without interruptions so that it generates a signal in response to detection of each and every properly oriented stack 6 on the belts 2. If the apparatus is to transfer selected (e.g., defective) paper stacks 6 from the path which is defined by the supply conveyor 1 into the path which is defined by the removing conveyor 9, the photocell 48 is activated only when it is approached by a defective stack 6. Activation of the photocell 48 can take place in a conventional manner, such as in response to signals which are generated by one or more sensors upstream of the junction X, as considered in the direction of arrow 7, e.g., at the location where the sheets are assembled to form successive stacks. The activating signals from such sensor or sensors are delayed by one or more shift registers or the like so that they reach the photocell 48 shortly before the corresponding (defective) stack 6 reaches the junction X, i.e., shortly before the respective stack moves into the range of the tongs 14. The manner in which the photocell 48 can be activated (e.g., by turning on its light source) when a commodity is to be manipulated by the tongs 14 at the junction X is conventional and forms no part of the invention. All that counts is to ensure that, when the apparatus is to divert selected stacks 6 onto the conveyor 9, the photocell 48 is activated in good time before a selected stack moves into the range of the tongs 14, i.e., when such stack is located at a predetermined distance from the tongs. The manner in which the stacks 6 are placed onto the belts 2 so that they form a file or row which moves in the direction of arrow 7 is also known and need not be described or shown here. If the photocell 48 is activated only at intervals (to initiate a change in the direction of movement of selected stacks 6), the remaining (e.g., satisfactory) stacks 6 continue to advance past the tongs 14 (the upper jaw 15 is then located at a level sufficiently above the uppermost sheets of satisfactory stacks so that it cannot interfere with the progress of such stacks) and are accepted by the belts 2' which continue to transport them in the direction of arrow 7.

When the photocell 48 is activated, it transmits a signal as soon as the trailing surface 6t of a stack 6 advances beyond the path of light between the light source of this photocell and the mirror 49. Such signal may be slightly delayed, depending on the speed of the stacks 6 on the table 4, prior to transmission to the regulating means for the pneumatic motor so that the cylinder 32 causes the piston rod 31, the coupling 29 and the splined shaft 27 to move downwardly and to move the upper jaw 15 from its upper end position. The underside of the upper jaw 15 engages the topmost sheet of the arriving stack 6 and cooperates with the lower jaw 16 to change the orientation of the engaged stack by turning it about the axis 17 in the direction indicated by the arrow 18. The peripheral speed of the disc-shaped jaws 15 and 16 is preferably selected in such a way that the stack portion 6a which is remotest from the axis 17 travels (about this axis) at a speed corresponding at least substantially to that of the belts 2 and 2'. In other words, the peripheral speed of the jaws 15 and 16 is preferably less than the speed of the belts 2.

The exact position of the reflection type photocell 52 relative to the path which is defined by the belts 11 of the removing conveyor 9 depends on the width of the processed stacks 6. This position is selected in such a way that the distance between the photocell 52 and the tongs 14 (as considered in the direction of arrow 13) suffices to ensure that the light rays which issue from the light source of the photocell 52 and are normally reflected by the mirror 53 are interrupted when the tongs 14 has completed the turning of a selected stack 6 or of one of a series of successive stacks through an angle of 90 degrees. As the reflection of light rays is interrupted, the photocell 52 transmits a signal which causes the pneumatic motor including the cylinder 32 to raise the upper jaw 15 so that the reoriented stack 6 is released and proceeds to advance with the upper reaches of the belts 11. The piston rod 31 raises the upper jaw 15 by way of the coupling 29 and splined shaft 27.

An important advantage of the improved apparatus is that its tongs 14 can properly but gently engage successive or selected stacks 6 or analogous commodities irrespective of the speed of the belts 2, 2' and 11. Furthermore, the tongs 14 can change the orientation of successive or selected stacks 6 with a surprisingly high degree of reproducibility because the extent of its angular movement while the jaws 15, 16 engage and hold a stack is determined with a high degree of accuracy. Still further, the interval which elapses between the actuation of the motor including the cylinder 32 in response to a signal from the photocell 48 and actual engagement of the topmost sheet of an oncoming stack 6 by the underside of the descending upper jaw 15 is very short because the starting position of the jaw 15 can be readily adjusted by the control means 39; this also contributes to the efficiency and high output of the apparatus while at the same time preventing the tongs 14 from interfering with the transport of commodities which are to remain on the conveyor 1. It has been found that the improved apparatus can be installed in the most recent ultramodern high-speed machines for the processing of paper sheets or the like without interfering with the operation of other components and without necessitating a reduction of the normal or maximum possible speed of the conveyor 1. The jaws 15 and 16 can engage a sufficiently large portion of an oncoming (large, medium-sized or small) stack 6 to ensure that the thus engaged stack is reoriented to an optimum extent and that the reorientation of each of a short or long series of successive or successively reoriented stacks is the same. Still another advantage of the improved apparatus is that the jaws 15, 16 of its tongs 14 can properly treat highly sensitive commodities, such as paper stacks consisting of very thin paper which is likely to be deformed and/or to tear in response to rough treatment and which is likely to be damaged in response to rapid acceleration or deceleration in a conventional apparatus. Moreover, the improved apparatus prevents any shifting of sheets or groups of sheets in a stack relative to each other irrespective of the rate of acceleration or deceleration and also irrespective of the speed at which the orientation of the stacks is changed during movement in the direction of arrow 18.

The tongs 14 exhibits the advantage that it takes very little time to engage a stack which is to be transferred onto the conveyor 9 and that the jaws 15, 16 are ready to engage a stack in each and every angular position. This is attributable to the fact that the jaws 15 and 16 of the illustrated tongs 14 are or include discs so that such discs can properly engage a stack, a portion of which has entered therebetween, irrespective of the momentary angular position of the shaft 27 and/or gear 22. This contributes significantly to the output of the improved apparatus, not only because a selected stack or each of a series of successive stacks can be rapidly transferred from the conveyor 1 onto the conveyor 9 but also because the transfer of selected stacks does not interfere with orderly transport of the remaining stacks from the belts 2 onto the belts 2' of the conveyor 1. The inertia of the axially movable jaw 15 is relatively low so that the movement of such jaw from its starting position into engagement with a stack, a portion of which extends into the range of the tongs 14, or back to the starting position takes up negligible amounts of time.

The coupling 29 exhibits the advantage that the shaft 27 can serve as a means for transmitting torque to the axially movable jaw 15 as well as that the shaft 27 can receive axial motion from the piston rod 31 of the operating means including the cylinder 32. This contributes to simplicity of the means for imparting rotary and reciprocatory movements to the axially movable jaw 15 as well as to accurate synchronization of rotary movements of the jaws 15 and 16. The jaws and the shaft 27 can rotate during each and every stage of axial movement of the shaft 27.

The actuating means including the photocells 48, 52 or analogous detector means exhibits the advantage that the extent of reorientation of each and every stack 6 which is to be transferred onto the conveyor 9 can be determined with a high degree of accuracy. In other words, such detector means determine the extent of angular movement of a stack 6 about the axis 17, and the just mentioned extent of angular movement is selected with a view to ensure that each stack which is transferred onto the conveyor 9 is maintained in an optimum orientation for proper delivery to its destination. This is particularly important when the commodities which are transferred onto the conveyor 9 are not defective or when they are not defective to such a degree as to require discarding. Another advantage of the detector means 48 and 52 is that they can be readily installed in proper positions irrespective of the angle between the paths which are defined by the conveyors 1 and 9, i.e., such detector means contribute to flexibility and versatility of the improved apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for changing the direction of transport of at least some of a series of successive commodities, comprising a first conveyor arranged to advance the commodities of said series along a first path; a second conveyor arranged to advance commodities along a second path which is at least substantially coplanar with and is inclined with reference to said first path; and means for transferring commodities from said first path into said second path, including openable and closable tongs rotatable about an axis which is adjacent to and inclined relative to said paths, said tongs extending into portions of said first and second paths, means for rotating said tongs about said axis, and operating means for opening and closing said tongs so that a commodity advancing along said first path can enter said tongs before the tongs closes to transfer the thus engaged commodity into said second path as a result of rotation about said axis, said tongs comprising a first jaw and a second jaw disposed at a level above said first jaw, said first jaw having a surface arranged to engage a commodity to be transferred and coplanar with said paths and said operating means comprising means for moving said second jaw relative to said first jaw, said rotating means comprising a rotary shaft whose axis coincides with said axis and which is connected with said second jaw, said first jaw having an axial passage with an outline complementary to the cross-section of and axially movably receiving said shaft, said shaft and said first jaw having means for transmitting torque from said shaft to said first jaw and vice versa in each axial position of said shaft.

2. The apparatus of claim 1, wherein said axis is at least substantially normal to the common plane of said paths.

3. The apparatus of claim 1, wherein the commodities are paper stacks.

4. The apparatus of claim 1, wherein said first conveyor includes a first portion arranged to deliver commodities into the range of said tongs and a second portion arranged to receive non-transferred commodities from said first portion.

5. The apparatus of claim 4, wherein said second conveyor branches off said first conveyor in the region between the first and second portions of said first conveyor.

6. The apparatus of claim 1, wherein said paths are at least substantially horizontal.

7. The apparatus of claim 1, wherein at least one of said jaws is a disc-shaped body.

8. The apparatus of claim 1, wherein said rotating means further comprises means for rotating said first jaw whereby said first jaw rotates said second jaw by way of said shaft.

9. Apparatus for changing the direction of transport of at least some of a series of successive commodities, comprising a first conveyor arranged to advance the commodities of said series along a first path; a second conveyor arranged to advance commodities along a second path which is at least substantially coplanar with and is inclined with reference to said first path; and means for transferring commodities from said first path into said second path, including openable and closable tongs rotatable about an axis which is adjacent to and inclined relative to said paths, said tongs extending into portions of said first and second paths, means for rotating said tongs about said axis, and operating means for opening and closing said tongs so that a commodity advancing along said first path can enter said tongs before the tongs closes to transfer the thus engaged commodity into said second path as a result of rotation about said axis, said tongs comprising a first jaw and a second jaw disposed at a level above said first jaw, said first jaw having a surface arranged to engage a commodity to be transferred and coplanar with said paths and said rotating means comprising a rotary shaft whose axis coincides with said axis and which is connected with said second jaw, said operating means comprising means for moving said second jaw relative to said first jaw including means for raising and lowering said shaft.

10. The apparatus of claim 9, wherein said means for raising and lowering said shaft comprises a fluid-operated motor.

11. The apparatus of claim 10, wherein said motor comprises a pneumatic cylinder and piston unit.

12. The apparatus of claim 10, wherein said motor comprises a reciprocable piston rod and said means for raising and lowering further comprises a coupling connecting said piston rod to said shaft so that the latter shares the axial movements of but is rotatable relative to said piston rod.

13. The apparatus of claim 12, wherein said coupling includes bearing means for said shaft.

14. The apparatus of claim 1, wherein said paths make an angle of at least approximately 90 degrees.

15. The apparatus of claim 1, further comprising means for actuating said operating means.

16. The apparatus of claim 15, wherein said actuating means includes detector means adjacent to said first path and arranged to generate signals in response to detection of an oncoming commodity at a preselected distance from said tongs.

17. The apparatus of claim 16, wherein each of the commodities in said first path has a trailing surface and said detector means is arranged to generate signals in response to detection of such trailing surfaces, said signals being utilized to effect closing the tongs.

18. The apparatus of claim 17, wherein said actuating means further comprises second detector means adjacent to said second path and arranged to generate signals in response to detection of a transferred commodity.

19. The apparatus of claim 18, wherein each of the commodities in said second path has a front surface and said second detector means is arranged to generate signals in response to detection of such front surfaces, the thus generated signals being utilized to effect opening of said tongs.

20. The apparatus of claim 1, wherein, said rotating means include means for rotating said jaws at a peripheral speed which is less than the speed of said first conveyor.

21. The apparatus of claim 1, wherein said operating means includes means for moving said second jaw from a starting position at a given distance from said first jaw toward said first jaw and back to said starting position, and further comprising control means for changing the starting position of said second jaw.

22. The apparatus of claim 21, wherein said moving means comprises a fluid-operated motor having a reciprocable piston rod operatively connected with said second jaw, said control means including means for displacing said motor in the direction of said axis.

23. The apparatus of claim 22, wherein said control means comprises a rotary feed screw.

24. The apparatus of claim 1, wherein at least one of said conveyors is a belt conveyor.

25. Apparatus for changing the direction of transport of at least some of a series of successive commodities, comprising a first conveyor arranged to advance the commodities of said series along a first path; a second conveyor arranged to advance commodities along a second path which is inclined with reference to said first path; and means for transferring commodities from said first path into said second path, including openable and closable tongs comprising two jaws and being rotatable about an axis which is adjacent to and inclined relative to said paths, said tongs extending into portions of said first and second paths, means for rotating said tongs about said axis, operating means for opening and closing said tongs so that a commodity advancing along said first path can enter said tongs before the tongs closes to transfer the thus engaged commodity into said second path as a result of rotation about said axis, said operating means including means for moving one of said jaws from a starting position at a given distance from the other of said jaws toward said other jaw and back to said starting position, said moving means including a fluid-operated motor having a reciprocable piston rod operatively connected with said second jaw, and control means for changing the starting position of said one jaw including a rotary feed screw for displacing said motor in the direction of said axis and means for rotating said feed screw to thereby move said motor toward and away from said other jaw.

* * * * *